United States Patent [19]
Allee

[11] Patent Number: 5,174,530
[45] Date of Patent: * Dec. 29, 1992

[54] SINGLE SURFACE DISPLAY KITE

[76] Inventor: Wesley N. Allee, 1232 W. Memphis, Broken Arrow, Okla. 74012

[*] Notice: The portion of the term of this patent subsequent to Dec. 24, 2008 has been disclaimed.

[21] Appl. No.: 799,354

[22] Filed: Nov. 27, 1991

Related U.S. Application Data

[63] Continuation of Ser. No. 694,423, May 2, 1991, Pat. No. 5,074,498.

[51] Int. Cl.$^5$ ............................................. B64C 31/06
[52] U.S. Cl. ................................................ 244/153 R
[58] Field of Search .................... 244/145, 146, 153 R

[56] References Cited

U.S. PATENT DOCUMENTS

| | | | |
|---|---|---|---|
| 3,740,008 | 6/1973 | Gravel | 244/153 R |
| 4,279,394 | 7/1981 | Loy | 244/153 R |
| 4,988,059 | 1/1991 | Allee | 244/153 R |

Primary Examiner—Galen Barefoot
Attorney, Agent, or Firm—Head & Johnson

[57] ABSTRACT

A kite of a single sheet of material extending from a straight leading edge rearwardly to a trailing edge has a pair of outermost struts, one at each end of the leading edge, which extend in substantially parallel relationship rearwardly from the leading edge and a plurality of parallel interior struts spaced between the outer struts in a narrow band extending perpendicular to and rearwardly from the leading edge. A plurality of interior keels, one extending downwardly from each of the interior struts to a lower tip thereof, have leading edges substantially perpendicular to the leading edge of the sheet of material. Two outermost keels, one extending downwardly from each outermost strut, have leading edges at a rearward angle from a perpendicular to the leading edge of the sheet of material, the inward and rearward angles being coordinated to reduce roll and likelihood of collapse of the kite during flight. Bridle lines extend from each of the keel tips to a single point of connection such that, with the bridle lines fully extended from the single point of connection, the leading edge of the kite takes the form of a bow.

11 Claims, 1 Drawing Sheet

SINGLE SURFACE DISPLAY KITE

This is a continuation of copending application Ser. No. 07/694,423 filed on May 2, 1991, now U.S. Pat. No. 5,074,498.

BACKGROUND OF THE INVENTION

This invention relates generally to kites, and more particularly concerns kites ranging from approximately four to approximately sixty feet or more in width.

Improved kites in the range of up to sixty feet in width were disclosed in my U.S. Pat. No. 4,988,059 which is herein incorporated by reference. Those kites, beginning with a width of approximately seven feet or more, fly quite stably under most meteorological conditions. However, kites in the range of approximately four to seven feet in width made according to the same teachings tend to roll to an undesirable degree. Furthermore, even the larger kites ranging from approximately fifteen to sixty feet in width have a tendency to roll, though within far more tolerable limits.

It is, therefore, an object of the present invention to provide an improved stable design for kites in the range of approximately four to sixty feet or more in width.

Another object of the present invention is to provide a large kite having the benefits of my earlier kite with reduced roll characteristics.

SUMMARY OF THE INVENTION

As with my earlier kite, the leading edge of a sheet of material is provided with a narrow lifting surface made up of multiple keels with substantially parallel rigid supports attached to this sheet of material in a side by side configuration and spanning the entire leading edge. Bridle lines of equal length are attached between every two adjacent keels at their forward lower corners to form a cell between the keels. A second set of bridle lines of equal length are attached at one end to the centers of the first set of bridle lines and joined at the opposite end of the bridle lines to form a union. A single flying line is attached to the union. Each keel includes a rigid support or strut along its length and a leading edge substantially perpendicular to its length. However, unlike my earlier kite, the outside two keels and struts are substantially parallel to the other keels and struts and have leading edges which are not substantially perpendicular to their length but are angled to a point as much as ¼ to ½ the length of the keel rearwardly of the leading edge of the kite. It has been found that the reduction of the taper effects a corresponding reduction in roll of the kite, but also results in a corresponding likelihood of the kite folding in light crosswinds, particularly for kites of approximately seven feet or less in width. However, it has also been found that angling the leading edges of the external keels prevents the kite from folding.

BRIEF DESCRIPTION OF THE DRAWING FIGURES

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
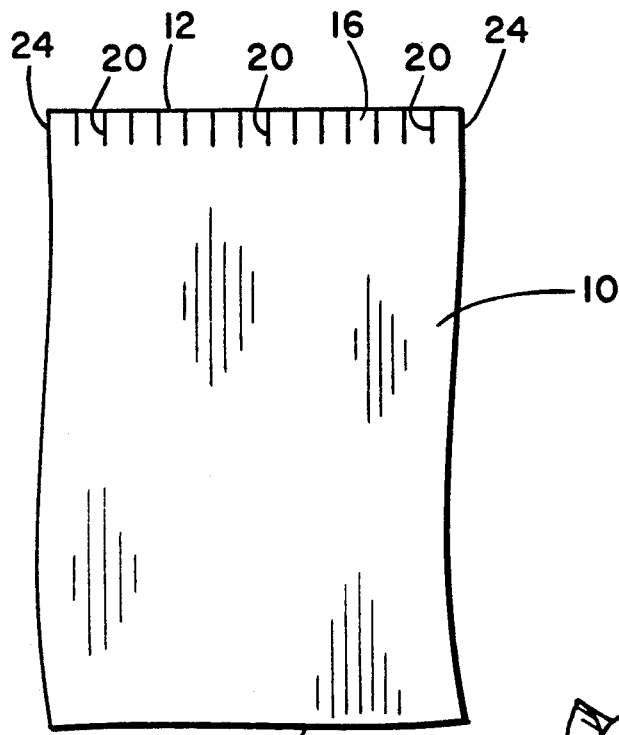
FIG. 1 is a bottom view of a rectangular embodiment of the kite illustrating the leading edge in comparison to the total surface area of the improved kite and the placement of the keels and rigid supports.
Figure 2:
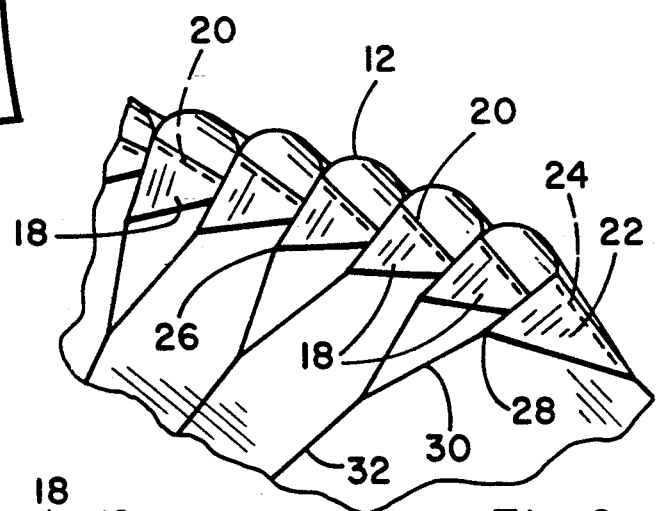
FIG. 2 is an enlarged partial perspective view of the kite of FIG. 1 illustrating the relationship between the outermost keels and the interior keels of the improved kite.
Figure 3:
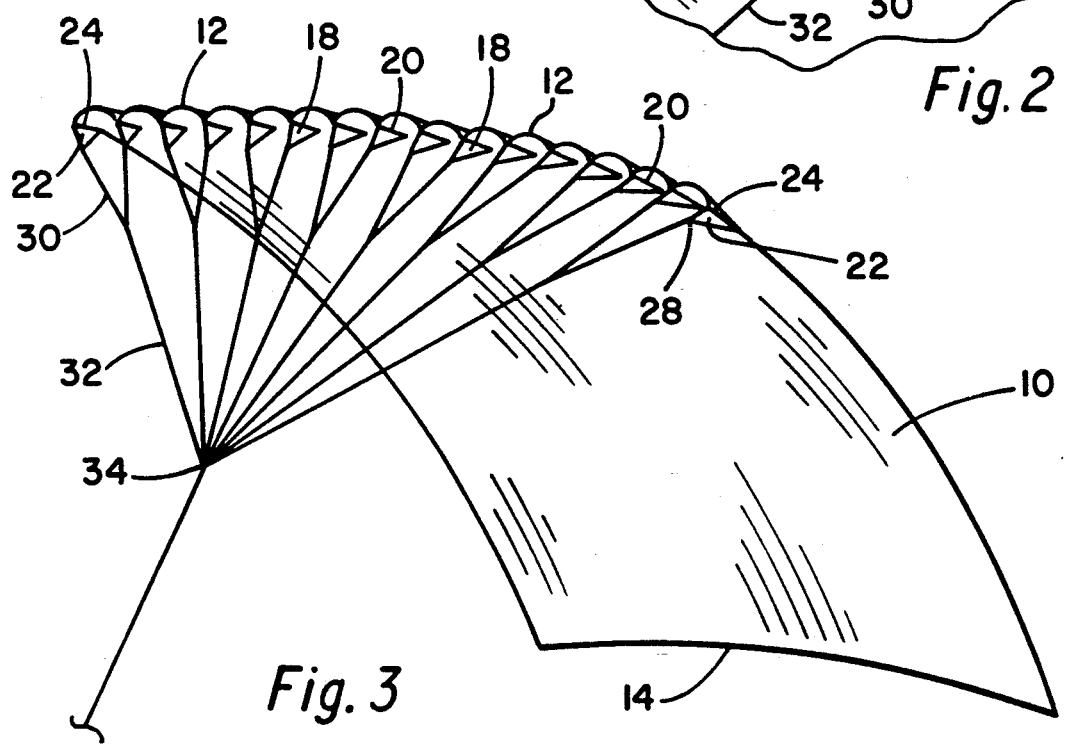
FIG. 3 is a perspective view of the improved kite of FIG. 1 in flight.

FIG. 1 illustrates a kite consisting of one large rectangular sheet of material 10 such as plastic, nylon, or the like, extending from a leading edge 12 to a trailing edge 14 with a narrow band 16 along the leading edge 12 which provides most of the lift for the kite. As seen more clearly in FIGS. 2 and 3, the leading edge 12 includes the band 16, interior keels 18 and spars 20 and outermost keels 22 and spars 24. As shown in FIGS. 2 and 3, the interior keels 18 have a leading edge substantially perpendicular to the spars 20 while the outermost keels 22 have a leading edge that angles to a point approximately ¼ to ½ the length of the spars 24 toward the trailing edge 14 of the kite. FIG. 3 also illustrates the bridle lines and their place of attachment on the lower forward tips 26 and 28 of the interior and outermost keels 18 and 22, respectively. A first set of bridle lines 30, all the same length, are attached between adjacent keels, including the interior and outermost keels 18 and 22. Another set of bridle lines 32, all the same length, are attached approximately to the centers of the first set of bridle lines 30. The interior spars 20 have a parallel relation to each other and the outermost spars 24 are substantially parallel but may be at least slightly farther apart at the leading edge 12 of the kite to provide some taper inwardly toward the trailing edge 14 of the kite. The second set of bridle lines 32 are typically extended to a length one and one half times the width of the leading edge 12 and are joined at a single union 34 as seen in FIG. 3. The taper of the outermost keels 22 may be minimized for kites approximately four to seven feet in width so that the interior and outermost keels 18 and 22 approach parallel and may be increased for larger kites of up to approximately sixty feet in width. The distance that the tips of the outermost keels 22 are displaced toward the trailing edge 14 of the kite will be increased as the taper is reduced to minimize roll without allowing the kite to collapse.

Thus, it is apparent that there has been provided, in accordance with the invention, an improved single surface display kite that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:
1. A kite comprising:
   a sheet of material extending from a straight leading edge rearwardly to a trailing edge;

a pair of outermost struts, one at each end of said leading edge, extending in substantially parallel relationship rearwardly from said leading edge;

a plurality of parallel interior strusts spaced between said outermost struts in a narrow band extending perpendicular to and rearwardly from said leading edge;

a plurality of keels, one extending downwardly from each of said struts to a lower tip thereof, interior ones of said keels having leading edges substantially perpendicular to said leading edge of said sheet of material and outermost ones of said keels having leading edges at a rearward angle from a perpendicular to said leading edge of said sheet of material, said outermost struts and keels being coordinated to reduce roll and likelihood of collapse of the kite during flight; and a plurality of bridle lines of substantially equal length, one extending from each of said keel tips to a single point of connection of said lines.

2. A kite according to claim 1, said sheet of material being rectangular.

3. A kite according to claim 2, said leading and trailing edges being spaced by a distance approximately 1.0 to 3.0 times the distance between said outermost of said struts.

4. A kite according to claim 2, said leading and trailing edges being spaced by a distance approximately 1.5 times the distance between said outermost of said struts.

5. A kite according to claim 1, said interior keels being right isosceles triangles.

6. A kite comprising:

a sheet of material extending from a straight leading edge rearwardly to a trailing edge;

a pair of outermost struts, one at each end of said leading edge, extending in substantially parallel relationship rearwardly from said leading edge;

a plurality of parallel interior struts spaced between said outermost struts in a narrow band extending perpendicular to and rearwardly from said leading edge;

a plurality of keels, one extending downwardly from each of said struts to a lower tip thereof, interior ones of said keels having leading edges substantially perpendicular to said leading edge of said sheet of material and outermost ones of said keels having leading edges at a rearward angle from a perpendicular to said leading edge of said sheet of material, said outermost struts and keels being coordinated to reduce roll and likelihood of collapse of the kit during flight; and a first plurality of bridle lines of substantially equal length, one connecting adjacent pairs of said keel tips including those of said outermost keels, and a second plurality of bridle lines of substantially equal length, each extending from the midpoint of one of said first plurality of bridle lines to a single point of connection.

7. A kite according to claim 6, said second plurality of bridle lines being approximately 1½ times the distance between said outermost struts.

8. A kite according to claim 6, said interior keels being right isosceles triangles.

9. A kite according to claim 6, said trailing edge being spaced from said leading edge by a distance approximately 1 to 3 times the distance between said outermost keels.

10. A kite according to claim 6, said trailing edge being spaced from said leading edge by a distance approximately 1 to 5 times the distance between said outermost keels.

11. A kite comprising:

a sheet of material extending from a straight leading edge rearwardly to a trailing edge;

a pair of outermost strusts, one at each end of said leading edge, extending in substantially parallel relationship rearwardly from said leading edge;

a plurality of parallel interior struts spaced between said outermost struts in a narrow band extending perpendicular to and rearwardly from said leading edge;

a plurality of keels, one extending downwardly from each of said struts to a lower tip thereof, interior ones of said keels having leading edges substantially perpendicular to said leading edge of said sheet of material and outermost ones of said keels having leading edges at a rearward angle from a perpendicular to said leading edge of said sheet of material, said outermost struts and keels being coordinated to reduce roll and likelihood of collapse of the kite during flight; and bridle means extending from each of said keel tips to a single point of connection such that, with said bridle means fully extended from said single point of connection, said leading edge takes the form of a bow.

* * * * *